United States Patent
Damodaran et al.

(10) Patent No.: US 9,258,822 B2
(45) Date of Patent: *Feb. 9, 2016

(54) INTELLIGENT LOAD BALANCING BANDWIDTH ALLOCATION FOR MULTIPLE INTERFACE WIRELESS DEVICES

(71) Applicant: BROADCOM CORPORATION, Irvine, CA (US)

(72) Inventors: Deepak Kumar Damodaran, Bangalore (IN); Sushant Kumar Mishra, Bangalore (IN); Jayaraman Nagarajan, Bangalore (IN); Rakesh Raman, Bangalore (IN)

(73) Assignee: BROADCOM CORPORATION, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/798,303

(22) Filed: Jul. 13, 2015

(65) Prior Publication Data

US 2015/0319764 A1 Nov. 5, 2015

Related U.S. Application Data

(63) Continuation of application No. 13/925,626, filed on Jun. 24, 2013, now Pat. No. 9,084,139.

(60) Provisional application No. 61/828,852, filed on May 30, 2013.

(51) Int. Cl.
H04L 12/26 (2006.01)
H04W 72/04 (2009.01)
H04W 28/08 (2009.01)

(52) U.S. Cl.
CPC ........ *H04W 72/0486* (2013.01); *H04W 28/085* (2013.01)

(58) Field of Classification Search
None
See application file for complete search history.

(56) References Cited

U.S. PATENT DOCUMENTS

| | | | |
|---|---|---|---|
| 2003/0185233 A1* | 10/2003 | Ji | H04L 12/5692 370/466 |
| 2008/0080457 A1* | 4/2008 | Cole | H04L 12/5692 370/342 |
| 2009/0034457 A1* | 2/2009 | Bahl | H04W 16/10 370/329 |

* cited by examiner

*Primary Examiner* — Edan Orgad
*Assistant Examiner* — Rebecca Song
(74) *Attorney, Agent, or Firm* — Garlick & Marksion; Randy W. Lacasse (57) ABSTRACT

A system and method is provided for intelligent bandwidth allocation in a wireless communication device supporting multiple interfaces. A wireless communications device operating in connection with a first communications interface and a second communications interface is capable of switching channels back and forth so as to receive beacons from both interfaces effectively and provide enough bandwidth for each interface for data traffic to continue without any observable interruptions.

20 Claims, 8 Drawing Sheets

INTELLIGENT LOAD BALANCING BANDWIDTH ALLOCATION FOR MULTIPLE INTERFACE WIRELESS DEVICES

CROSS REFERENCE TO PRIORITY APPLICATIONS/INCORPORATION BY REFERENCE

This present U.S. Utility patent application claims priority pursuant to 35 U.S.C. §120 as a continuation of U.S. Utility application Ser. No. 13/925,626, filed on Jun. 24, 2013, entitled "Intelligent Load Balancing Bandwidth Allocation for Multiple Interface Wireless Devices," scheduled to issue as U.S. Pat. No. 9,084,139, which claims priority pursuant to 35 U.S.C. §119(e) to U.S. Provisional Patent Application Ser. No. 61/828,852, entitled "Intelligent Load Balancing Bandwidth Allocation for Multiple Interface Wireless Devices," filed May 30, 2013, both of which are hereby incorporated herein by reference in their entirety and made part of the present U.S. Utility patent application for all purposes.

BACKGROUND

1. Technical Field

The present disclosure described herein relates generally to wireless communications and more particularly to bandwidth allocation in wireless communication devices.

2. Description of Related Art

Communication systems are known to support wireless and wire line communications between wireless and/or wire line communication devices. The communication systems range from national and/or international mobile/handheld systems to the point-to-point gaming, in-home wireless networks, audio, video wireless devices. Communication systems typically operate in accordance with one or more communication standards. Wireless communication systems operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, and other equivalents communicate directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). Typically, the transceiver includes a data modulation stage and an RF stage. The data modulation stage (baseband process) converts between data and baseband signals in accordance with the particular wireless communication standard. The RF stage (transmitter section and receiver section) converts between baseband signals and RF signals. The RF stage may be a direct conversion transceiver that converts directly between baseband and RF or may include one or more intermediate frequency stages.

BRIEF SUMMARY

Brief Description of the Drawing(s)

DETAILED DESCRIPTION

In one or more embodiments of the technology described herein, a system and method is provided for intelligent bandwidth allocation in a wireless communication device supporting multiple interfaces.

Figure 1:
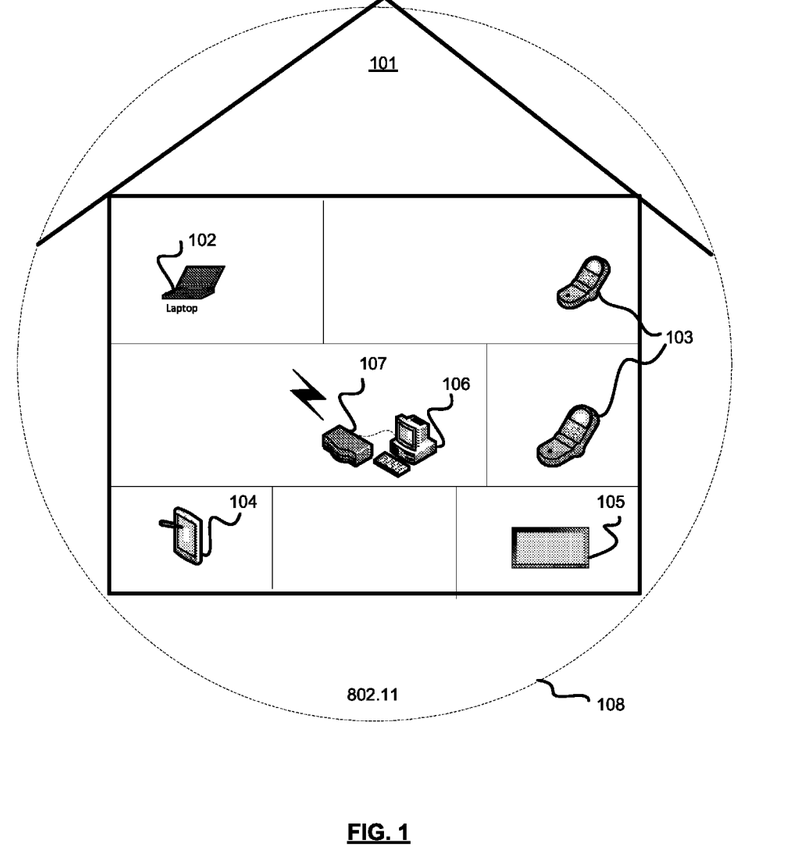
FIG. 1 illustrates one embodiment of a communications network in accordance with the present disclosure.

FIG. 1 illustrates one embodiment of a communications network in accordance with the present disclosure. As shown, FIG. 1 illustrates a home or building structure (premises) with one or more devices, wired or wireless, connected on a home network (802.11). A home or building structure (premises) 101 has one or more communication devices, wired or wireless (e.g., laptops 102, smart phones 103, tablets 104, web-enabled TVs 105, PCs 106, and other devices with wireless connectivity) connected on a home network. Internet services (e.g., broadband or high speed broadband) are communicatively connected to an access point 107 over wired (e.g., telephone, fiber, satellite, or cable) or wireless (e.g., 3G, 4G, etc.) networks. Access point 107 (e.g., a wireless router), connected, for example, to a PC 106 or Wi-Fi hotspot, will manage connection of the various devices to the internet using the 802.11 ac protocol 108. However, other variations of the 802.11 standard can be used without departing from the scope of the technology described herein.

The 802.11 infrastructure network, such as the previously described home network, forms a wireless local area network (WLAN) which is distinguished by the use of the access point. Access points are used for communications in the infrastructure network. The access point sends its capabilities in beacon frames or probe response frames. A beacon frame is a frame that is periodically transmitted by the access device to announce its availability. Alternatively, a probe response frame is a frame sent from the access point in response to a probe request frame sent from a communications device. The probe response frame provides capability information, supported data rates and other access point details pertaining to the WLAN.

In one or more embodiments of the technology described herein, the communication devices can be personal computers, laptops, PDAs, smartphones, mobile phones, such as cellular telephones, devices equipped with wireless local area network or Bluetooth transceivers, FM tuners, TV tuners, digital cameras, digital camcorders, wireless printers, or other devices that either produce, process or use audio, video signals or other data or communications.

In operation, the communication devices include one or more applications that include voice communications such as standard telephony applications, voice-over-Internet Protocol (VoIP) applications, local gaming, Internet gaming, email, instant messaging, multimedia messaging, web browsing, audio/video recording, audio/video playback, audio/video downloading, playing of streaming audio/video, office applications such as databases, spreadsheets, word processing, presentation creation and processing and other voice and data applications.

Unlike the home network, a peer-to-peer (P2P) network is one in which each communications device in the network can act as a client or server for the other devices in the network, allowing shared access to various resources such as files, peripherals, and sensors without the requirement for a central server or dedicated Internet access point. Peer-to-peer networks can be used for sharing content such as audio, video, data, or anything in digital format.

Figure 2:
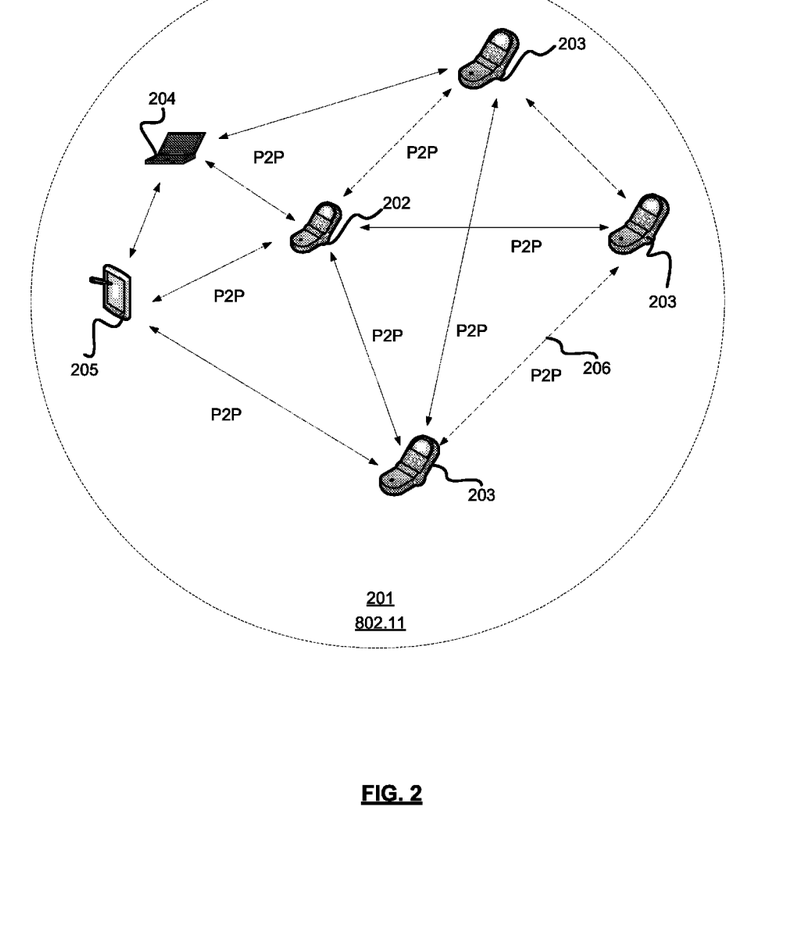
FIG. 2 illustrates another embodiment of a communications network in accordance with the present disclosure.

FIG. 2 illustrates another embodiment of a communications network in accordance with the present disclosure. As shown in FIG. 2, a peer-to-peer (P2P) group 201 includes various wirelessly connected devices, for example, cell phone(s) 202 and smart phone(s) 203(3), laptop(s) 204, tablet(s) 205, and other devices with wireless communications capabilities. Each of the wireless communication devices can form direct peer-to-peer connections without communicating through an access point first. When connected to the peer-to-peer group, each device represents an individual peer within that peer-to-peer group. A group owner (GO), for example cell phone 202, will control connection of the various devices in the group using, for example, but not limited to, the 802.11(N) protocol (where N represents any version of the 802.11 standard, e.g., 802.11g, 802.11n, 802.11ac, etc.). In one embodiment, each peer initiates a Tunneled Direct Link Setup (TDLS) 206 for direct communication between peer devices in the group. In alternative embodiments, the peer-to-peer network also includes one or more nodes capable of cross-connecting to another network. For example, Internet services (e.g., broadband or high speed broadband) can, in some embodiments, be provided to one or more communication devices using broadband Internet access from, e.g., telephone, fiber, satellite, cellular or cable networks (e.g., 3G, 4G, etc.).

In one embodiment, in accordance with the present disclosure, wireless device technology includes creation of multiple wireless communications interfaces (connections) with more than one device. For example, wireless communication devices having a transceiver establishes a first communications interface with an access point and a second communications interface with another wireless communications device through, for example, a direct peer-to-peer type connection. Using a time division algorithm, the two communication interfaces are alternatively serviced. The time slice given to each interface is such that both interfaces get a chance to complete their transmission/reception (TX/RX) without losing their connection to, for example, an access point/group owner/peer.

With software intelligence, it is possible to achieve two interfaces simultaneously using a single wireless communication device, typically referred to as concurrent mode of operation. In concurrent mode of operation the interfaces operate on either the same channel (i.e., concurrent same channel operation) or different channels (i.e., virtual simultaneous dual band (VSDB)). For VSDB, the different channels are supported through time division multiplexing (TDM) by shifting between channels (each channel corresponding to an interface) back and forth as to receive beacon frames from both interfaces effectively and provide enough time for each interface to receive data traffic without any observable interruptions.

Figure 3:
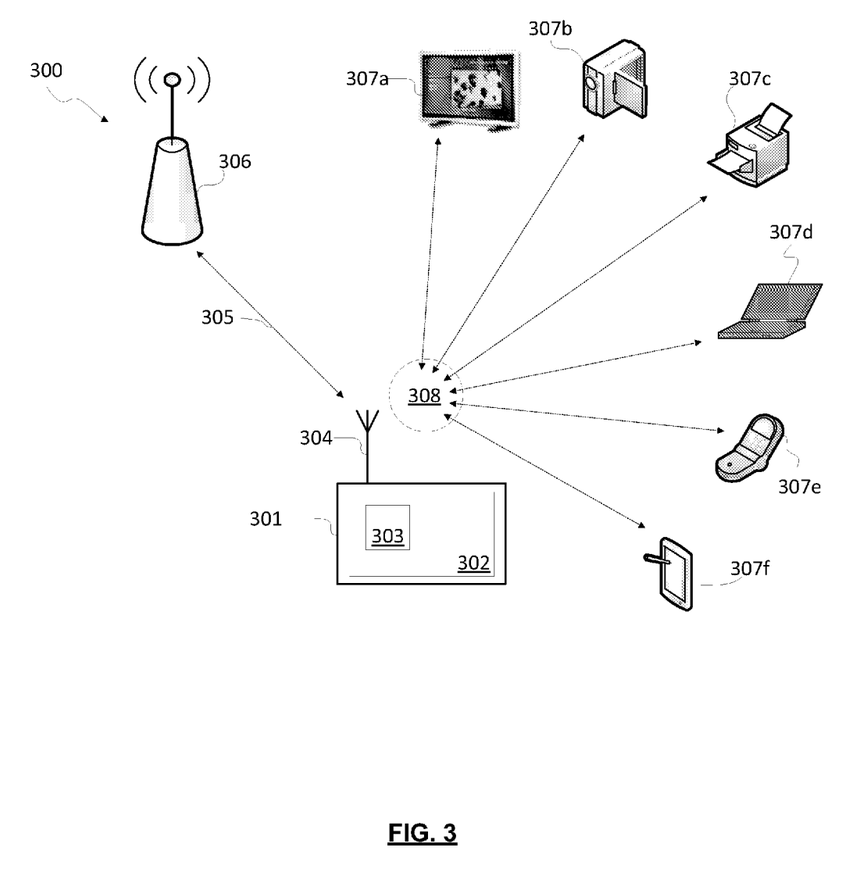
FIG. 3 illustrates a multiple interface embodiment of the wireless communication system in accordance with the present disclosure.

FIG. 3 illustrates a multiple interface embodiment of the wireless communication system in accordance with the present disclosure. System 300 includes a wireless communications device (e.g., a tablet) 301 having a first communications interface from antenna 304 through wireless connection 305 with access point 306 for accessing, for example, the Internet. Wireless communications device 301 is also connected, in a second communications interface through antenna 304, to one or more wireless enabled devices 307a through 307f through a direct P2P connection 308. Wireless communications device 301 includes one or more transceiver modules 302 with at least one radio signal processing chain 303 (i.e., sequence of connected transmitter/receiver components (amplifiers, filters, mixers, converters, etc.)). In VSDB/VSDC, a single PHY (physical layer) is configured in two different channels based on a timing pattern. For example, to support channel 1 and channel 36, the system is configured to be in channel 1 for 50 ms and in channel 36 for the next 50 ms with repeated switching between these channels.

In one embodiment, wireless communication device 301 is operable to download content from the Internet over a first communications interface with an access point and relay the same content to a second wireless communication device over a second communications interface, such as the shown peer-to-peer connection.

Figure 4A:
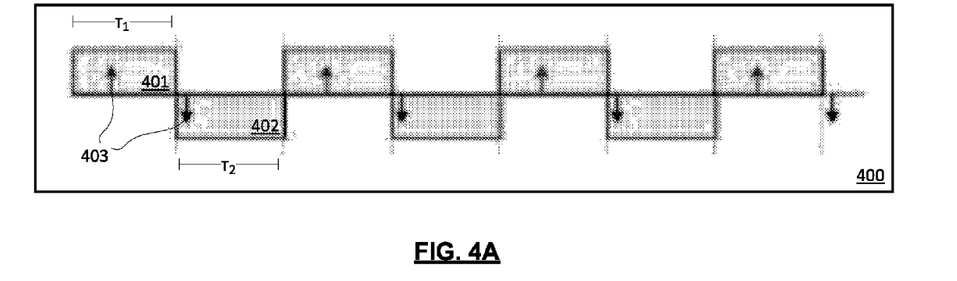
FIGS. 4A and 4B illustrate timing diagrams for multiple interface embodiments of the wireless communication system in accordance with the present disclosure.
Figure 4B:
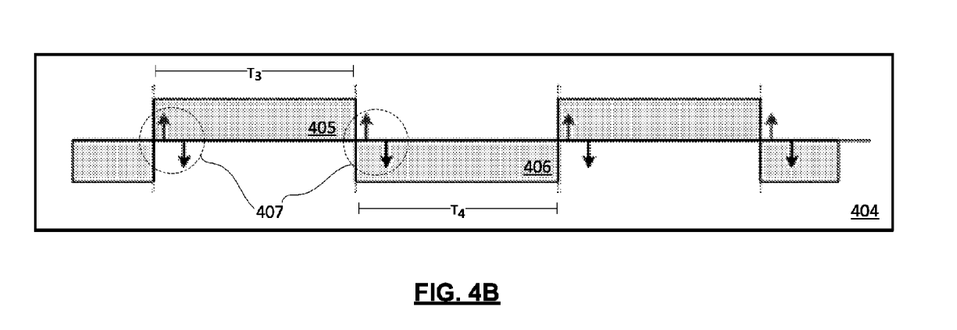

FIGS. 4A and 4B illustrate timing diagrams for multiple interface embodiments of the wireless communication system in accordance with the present disclosure. FIG. 4A depicts timing diagram 400 for a non-overlapping beacon dual interface TDM operation on a VSDB. If the beacons of two different wireless networks are well separated, so that both channels receive both beacons, it is called non-overlapping beacon condition. In this instance, switching is not done for the interfaces. The interfaces will be always active. The switching is performed for PHY between channels. As shown, channel switching between a first communications interface 401 and a second communications interface 402 is achieved by spending equal amounts of time ($T_1=T_2$) in each individual interface. Non-overlapping beacon frames 403 are far enough apart so that each beacon frame is transmitted within the same time period as the effective channel switch. Alternatively, FIG. 4B depicts an overlapping beacon dual interface TDM timing diagram 404 with equally allocated bandwidth ($T_3=T_4$) showing overlapping beacon frames 407 transmitted from both interfaces, first communications interface 405 and second communications interface 406, at each channel switch. This alternative beacon selection does not allow for enough time to switch the channel as well as receive both beacons.

In most peer-to-peer connections, however, the bandwidth requirement is greater for the peer-to-peer interface than for the interface used to download the content from the Internet. For example, the bandwidth requirement for downloading content from the Internet is 4 mbps while the requirement for the peer-to-peer interface is 15-20 mbps. In one embodiment, a wireless communication device is provided that intelligently allocates bandwidth to individual interfaces such that both interfaces get the required bandwidth to support their applications. In another embodiment, the bandwidth allocation is dynamically adjusted without involving the application layer of the wireless application protocol (WAP) layers.

Figure 5:
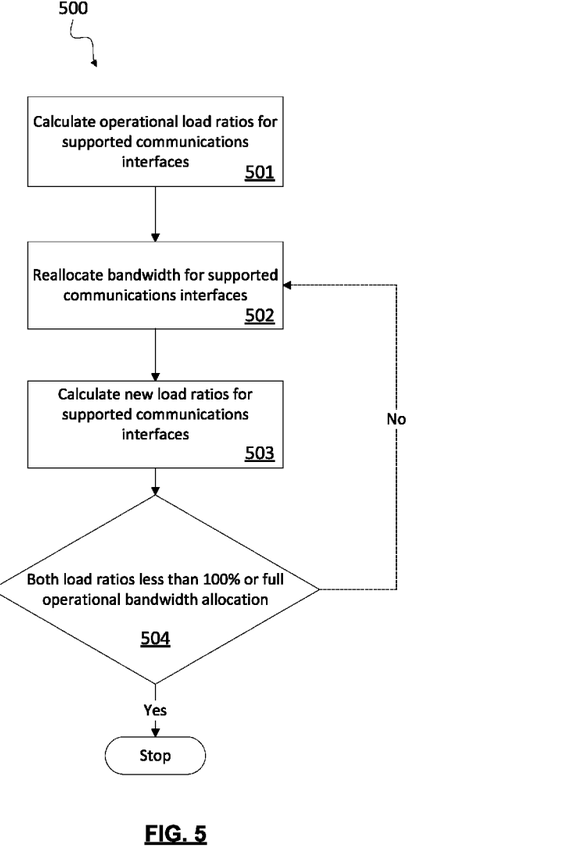
FIG. 5 illustrates a flowchart embodiment of the wireless communication system in accordance with the present disclosure.

FIG. 5 illustrates a flowchart embodiment of the wireless communication system in accordance with the present disclosure. Process 500 begins with a wireless communication device in communication with a first communications interface and a second communications interface (simultaneous communications interfaces supported). The wireless communication device calculates the operational load ratios (described in greater detail hereafter) for each of the first communications interface and the second communications interface in step 501. By default, the wireless communication device allocates bandwidth to each interface equally. In one example embodiment, one of the first communications interface and/or the second communications interface is operating at a full load ratio (100%). The bandwidth is reallocated in step 502 thus reducing (modifying) either the first communications interface and/or the second communications interface to below a full load ratio.

The allocation of bandwidth is determined based on several factors. In one embodiment, traffic activity (i.e., the number of transmitted and received data packets) is used to determine the bandwidth allocated to each interface. In another embodiment, the current bandwidth of each interface is used. In yet another embodiment, the physical layer (PHY) rate of the traffic at each interface is used for determining allocation. Accordingly the packet activity rate per bandwidth (i.e., load ratio) for each interface is calculated as:

Load ratio=(time used for transmission/reception (TX and RX) activity on a channel)/Bandwidth (BW)

In step 503, the load ratios of the first communications interface and the second communications interface are calculated. A determination is made in step 504, that if both load ratios are less than 100% or each of the communications interfaces is at full operational bandwidth allocation (100% of bandwidth needed), the process is complete. If the requirement has not been met, the process returns to step 502 to reallocate the bandwidth again. The process, beginning with 502, is repeated until requirements of step 504 have been met.

Example 1

A wireless communication device equally allocating bandwidth to two interfaces where a first communications interface has a load ratio of 100% and a second communications interface with a load ratio of 50% would require an adjustment to the bandwidth of both interfaces. Since the first communications interface has a current load ratio of 100%, an adjustment to the bandwidth allocation would benefit both interfaces by balancing the traffic load. Adjusting the load ratio of the second communications interface to 90% would result in allocating approximately 28% of the bandwidth to the second communications interface and approximately 72% of the bandwidth to the first communications interface. There is more traffic load on the first communications interface over the second communications interface for the same packet activity rate and as a result, more bandwidth is dedicated to the first communications interface.

Example 2

A wireless communication device with a first communications interface has a bandwidth allocation of 75% and a load ratio of 100% while a second communications interface has a bandwidth allocation of 25% and a load ratio of 100%. Since both interfaces have a load ratio of 100% the wireless communication device is giving less priority to the second communications interface. The second communications interface bandwidth is increased to 35% and a load ratio is calculated for the second communications interface. In one embodiment, a new bandwidth is arbitrarily selected for the second communications interface (i.e., 40%). The bandwidth reallocation to the second communications interface is iteratively performed until the load ratio measures less than 100% or the bandwidth allocation for the second communications interface reaches 50%.

Figure 6:
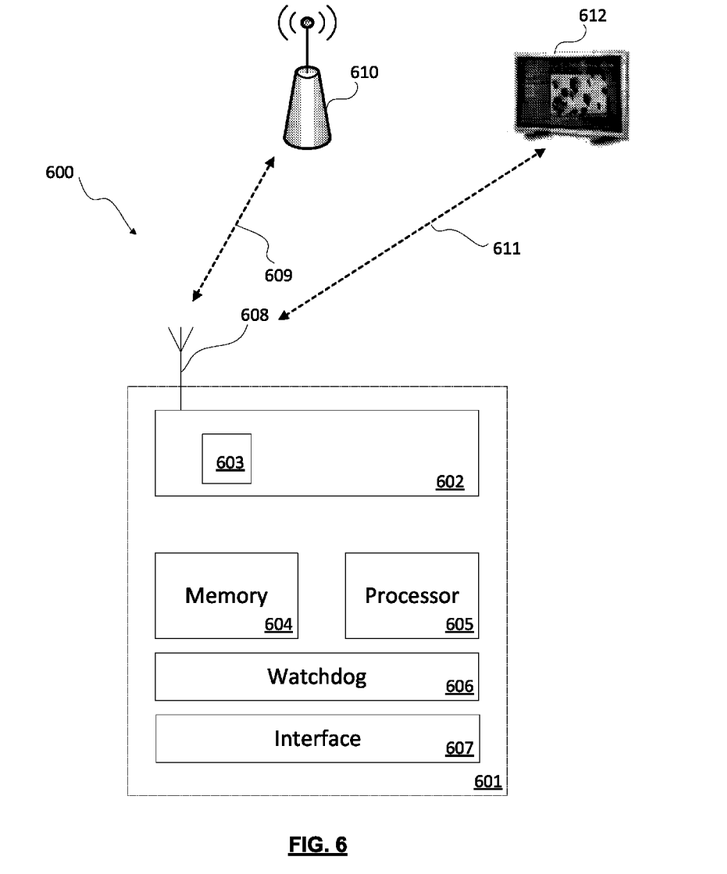
FIG. 6 is a schematic block diagram of an embodiment of a wireless communication system in accordance with the present disclosure.

FIG. 6 is a schematic block diagram of an embodiment of a wireless communication system in accordance with the present disclosure. Wireless communication system 600 provides for a communications interface (connection 609) between access point 610 and wireless communications device 601. Wireless communications device 601 includes radio transceiver module 602 with at least one signal processing chain 603 for processing multiple radio signal streams transmitted/received by antenna 608. While shown as one antenna, multiple antenna arrangements such as MIMO (multiple in multiple out) configurations are within the scope of the technology described herein. In addition, processor module 605 with memory 604 and interface module 607 process both communication and non-communication functions of the wireless communications device, store communication and non-communication data, interface to include processing of visual and non-visual external and internal processed data, measure load ratios for multiple connected interfaces and reallocate bandwidth to each interface. Wireless communications device 601 is in communication with access point 610 through a first communications interface 609 from radio transceiver 602. In one embodiment, the wireless communications device 601 establishes a second communications interface through connection 611 between second wireless enabled (e.g., a wireless enabled television) 612 and radio transceiver 602 for creating a peer-to-peer connection. A watchdog module 606, operated by or as part of processor module 605, continuously (e.g., repeats every second) runs the bandwidth allocation algorithm to make adjustments as needed. For example, the watchdog module calculates a first operational load ratio for the first communications interface and a second operational load ratio for the second communications interface. The operational load ratios are used by the processor module to adjust bandwidth according to the present disclosure.

Figure 7:
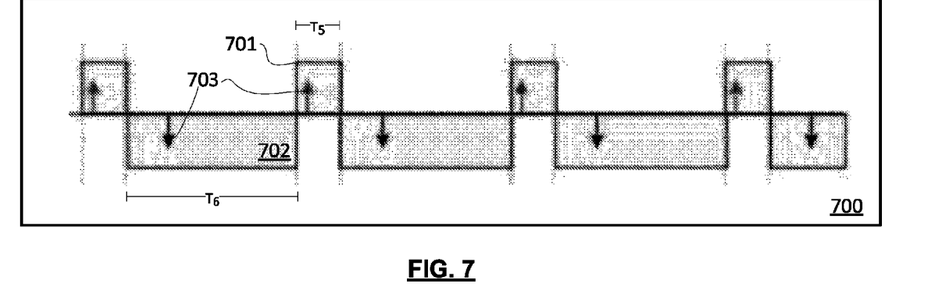
FIG. 7 illustrates a timing diagram for a multiple interface embodiment of the wireless communication system in accordance with the present disclosure.

FIG. 7 illustrates a timing diagram for a multiple interface embodiment of the wireless communication system in accordance with the present disclosure. Timing diagram 700 shows a non-overlapping beacon dual interface where channel switching between first communications interface 701 and second communications interface 702 is achieved by spending more time (i.e., $T_5<T_6$) on second communications interface 702 than first communications interface 701. Non-overlapping beacon frames 703 are transmitted based on channel switching. In one embodiment, timing diagram 700 represents a peer-to-peer connection from a first wireless communication device with a first communications interface with an access point where the peer-to-peer connection between the first wireless communication device and a second wireless communication device requires more bandwidth than the first communications interface with the access point.

Figure 8A:
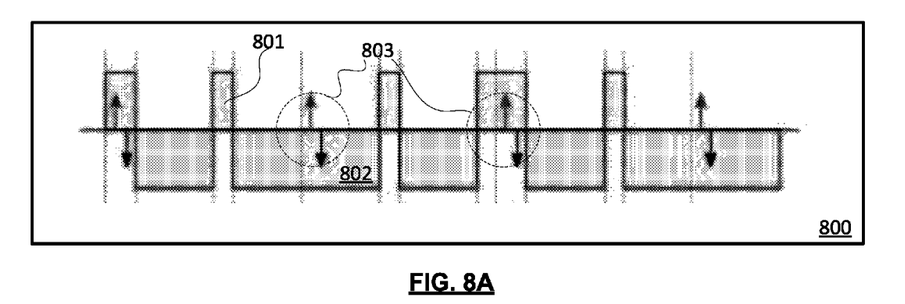
FIGS. 8A and 8B illustrate timing diagrams for alternative embodiments of a dual interface wireless communications device in accordance with the present disclosure.

FIG. 8A illustrates a timing diagram for an alternative embodiment of a dual interface wireless communications device according to the technology described herein. Timing diagram 800 represents a different scheme of overlapping beacon frames 803 where the minimum channel time required for transmission of data, for both first communications interface 801 and second communications interface 802, is more than half of the channel time allocated and as a result additional time is required. For example, the first communications interface has a bandwidth allocation of 30% and the second communications interface has a bandwidth allocation of 70% (as shown). In one embodiment, bandwidth allocation is achieved by using a switching pattern that yields an average allocation of 30% for the first communications interface. In timing diagram 800, the bandwidth is allocated using a switching pattern of 30%, 35%, 15%, 70%, 15%, 35% (i.e., bandwidth 1, bandwidth 2/2, bandwidth 1/2, bandwidth 2, bandwidth 1/2, bandwidth 2).

Figure 8B:
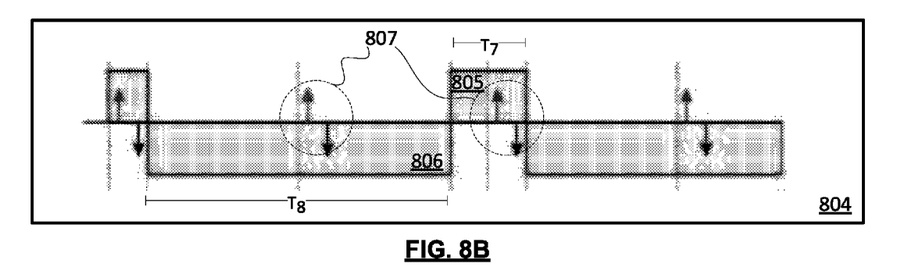

FIG. 8B illustrates a timing diagram for an alternative embodiment of a dual interface wireless communications device according to the technology described herein. Timing diagram 804 shows an overlapping beacon dual interface for a wireless communication device, similar to FIG. 7, where channel switching between first communications interface 805 and second communications interface 806 is achieved by spending more time (i.e., $T_8 > T_7$) on first communications interface 805 than second communications interface 806. Timing diagram 804 depicts beacon frames 807 that are transmitted at constant timing interval $T_9$. In this scenario, the minimum channel time required for transmission of data is less than half of the channel time allocated to first communications interface 805. As a result, using the switching pattern discussed for FIG. 8A, switching between channels would be very difficult within the time frame provided for averaging the bandwidth allocation. In one embodiment, the bandwidth allocation is averaged using an alternative switching pattern. For example, bandwidth allocation is achieved in a switching pattern of 30%, 170%, 30%, 170%, etc. resulting in an effective bandwidth allocation of 15% for the first communication interface and 85% to the second communications interface.

The technology described herein operates for wireless communication devices such as, but not limited to, Bluetooth, remotes, game controllers, stereo headphones, keyboards, 3D glasses and other devices. In related embodiments, these wireless communication devices have the ability to stream audio to home stereos, enable voice recognition in remote controls and connect smartphones and other devices to a wireless ecosystem.

While the disclosure describes a first communications interface as a connection to an access point and a second interface as a P2P connection, the interfaces are not limited thereto. Other known and future communication techniques and communications interfaces are envisioned without departing from the scope of the technology described herein. For example, the two communications interfaces can be AP/AP, P2P/P2P, BS/P2P (base station/P2P), etc. In addition any number of antennas can be used with the communications interfaces without departing from the scope of the technology described herein.

In one or more embodiments the technology described herein the wireless connection can communicate in accordance with a wireless network protocol such as Wi-Fi, WiHD, NGMS, IEEE 802.11a, ac, b, g, n, or other 802.11 standard protocol, Bluetooth, Ultra-Wideband (UWB), WIMAX, or other wireless network protocol, a wireless telephony data/voice protocol such as Global System for Mobile Communications (GSM), General Packet Radio Service (GPRS), Enhanced Data Rates for Global Evolution (EDGE), Personal Communication Services (PCS), or other mobile wireless protocol or other wireless communication protocol, either standard or proprietary. Further, the wireless communication path can include separate transmit and receive paths that use separate carrier frequencies and/or separate frequency channels. Alternatively, a single frequency or frequency channel can be used to bi-directionally communicate data to and from the communication device.

Throughout the specification, drawings and claims various terminology is used to describe the various embodiments. As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship.

In an embodiment of the technology described herein, receiver and transmitter processing modules are implemented via use of a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. In some embodiments, the associated memory is a single memory device or a plurality of memory devices that are either on-chip or off-chip. Such a memory device includes a read-only memory, random access memory, volatile memory, non-volatile memory, static memory, dynamic memory, flash memory, and/or any device that stores digital information. Note that when the processing devices implement one or more of their functions via a state machine, analog circuitry, digital circuitry, and/or logic circuitry, the associated memory storing the corresponding operational instructions for this circuitry is embedded with the circuitry comprising the state machine, analog circuitry, digital circuitry, and/or logic circuitry.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The technology as described herein has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed technology described herein. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed technology described herein. One of average skill in the art will also recognize that the functional building blocks, and other illustrative blocks, modules and components herein, can be implemented as illustrated or by discrete components, application specific integrated circuits, processors executing appropriate software and the like or any combination thereof.

The technology as described herein may have also been described, at least in part, in terms of one or more embodiments. An embodiment of the technology as described herein is used herein to illustrate an aspect thereof, a feature thereof, a concept thereof, and/or an example thereof. A physical embodiment of an apparatus, an article of manufacture, a machine, and/or of a process that embodies the technology described herein may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

While particular combinations of various functions and features of the technology as described herein have been expressly described herein, other combinations of these features and functions are likewise possible. The technology as described herein is not limited by the particular examples disclosed herein and expressly incorporates these other combinations.

The invention claimed is:
1. A mobile communications device comprising:
a processor configured to manage multiple communication connections;
a watchdog component operative with the processor and configured to calculate:
a first packet activity rate per bandwidth ratio for a first communications connection of the multiple communication connections; and
a second packet activity rate per bandwidth ratio for a second communications connection of the multiple communication connections; and
wherein the processor is further configured to reallocate bandwidth to the first and second communications connections based on a relative operational bandwidth usage as determined by a comparison of the first and second packet activity rate per bandwidth ratios according to at least one of: a virtual simultaneous dual band (VSDB) mode where the reallocated bandwidth comprises adopting a band switching pattern to achieve a full operational bandwidth for at least one of the first and second communications connections or virtual simultaneous dual channel (VSDC) mode where the reallocated bandwidth comprises adopting a channel switching pattern to achieve a full operational bandwidth for at least one of the first and second communications connections.
2. The mobile communications device of claim 1, wherein the first communications connection is provided over a first communications channel and the second communications connection is provided over a second communications channel.

3. The mobile communications device of claim 2, wherein the processor is further configured to switch back and forth between the first and second communications channels in the channel switching pattern based on the reallocated bandwidth.

4. The mobile communications device of claim 3, wherein the channel switching pattern is selected with communication beacons received for each of the first and second communications connections.

5. The mobile communications device of claim 3, wherein the channel switching pattern is selected with overlapping communication beacons for each of the first and second communications connections.

6. The mobile communications device of claim 3, wherein the channel switching pattern is selected as a repeating pattern to average the reallocated bandwidth.

7. The mobile communications device of claim 3, wherein the channel switching pattern is selected as a varied pattern to average the reallocated bandwidth.

8. The mobile communications device of claim 3, wherein the channel switching pattern is selected with non-overlapping communication beacons for each of the first and second communications connections.

9. The mobile communications device of claim 1, wherein the configured to calculate process is performed on a repeated basis until at least one of the first and second communications connections is operating at the full operational bandwidth via the reallocated bandwidth.

10. The mobile communications device of claim 1, wherein a physical layer (PHY) rate of traffic at the first and second communications connections is used when calculating the first and second packet activity rate per bandwidth ratios.

11. A system supporting multiple communication connections on a single wireless communications device, the system comprising:
   a processor including a watchdog component configured to:
      calculate a first operational load ratio for a first communications connection of the multiple communication connections; and
      calculate a second operational load ratio for a second communications connection of the multiple communication connections, the second communications connection operating concurrently with the first communications connection, the first operational load ratio and the second operational load ratio calculated according to respective time used for transmission/reception (TX/RX) activity on each of the first and second communications connections as divided by respective operational bandwidth allocations of the first and second communications connections; and
      reallocate the respective operational bandwidth allocations for the first and second communications connections based on the calculated first and second operational load ratios for the first and second communications connections.

12. The system of claim 11, wherein the reallocation is repeatedly performed until at least one of the first and second communications connections is operating at a full operational bandwidth allocation.

13. The system of claim 11, wherein a physical layer (PHY) rate of traffic at the first and second communications connections is used when calculating the first and second operational load ratios.

14. The system of claim 11, wherein the wireless communications device operates in virtual simultaneous dual band (VSDB) mode when supporting the multiple communication connections and the reallocation comprises adopting a band switching pattern to achieve full operational bandwidth for at least one of the first and second communications connections.

15. The system of claim 11, wherein the wireless communications device operates in virtual simultaneous dual channel (VSDC) mode when supporting the multiple communication connections and the reallocation comprises adopting a channel switching pattern to achieve full operational bandwidth for at least one of the first and second communications connections.

16. A wireless communications device, comprising:
   communications circuitry simultaneously supporting a first communications connection and a second communications connection;
   watchdog circuitry calculating a first operational load ratio for the first communications connection and a second operational load ratio for the second communications connection, the first operational load ratio and the second operational load ratio calculated according to respective time used for transmission/reception (TX/RX) activity on each of the first and second communications connections as divided by respective operational bandwidth allocations for the first and second communications connections; and
   a processor configured to reallocate bandwidth to the respective first and second communications connections including modifying one or more of the first and second operational load ratios for the first and second communications connections until at least one of the first and second communication connections is operating at a full operational bandwidth.

17. The wireless communications device of claim 16, wherein the reallocated bandwidth is allocated by switching back and forth between the first and second communications connections in a switching pattern including one or more of:
   a first pattern to receive communication beacons for each of the first and second communications connections;
   a second pattern to receive overlapping communication beacons for each of the first and second communications connections;
   a third pattern including a repeated pattern to average the reallocated bandwidth;
   a fourth pattern including a varied pattern to average the reallocated bandwidth; or
   a fifth pattern to receive non-overlapping communication beacons for each of the first and second communications connections.

18. The wireless communications device of claim 16, wherein the processor reallocates bandwidth a plurality of times until the first and second communications connections are both operating at the full operational bandwidth for each of the first and second communications connections, respectively.

19. The wireless communications device of claim 16, wherein the wireless communications device operates in virtual simultaneous dual band (VSDB) mode when supporting the first and second communication connections and the reallocation comprises adopting a band switching pattern to achieve the full operational bandwidth for at least one of the first and second communications connections.

20. The wireless communications device of claim 16, wherein the wireless communications device operates in virtual simultaneous dual channel (VSDC) mode when supporting the first and second communication connections and the reallocation comprises adopting a channel switching pattern to achieve the full operational bandwidth for at least one of the first and second communications connections.

* * * * *